(12) United States Patent
Yoshida

(10) Patent No.: US 6,211,984 B1
(45) Date of Patent: *Apr. 3, 2001

(54) CLIPPING DISTORTION CONTROLLING CIRCUITS

(75) Inventor: Toshiro Yoshida, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/816,677

(22) Filed: Mar. 13, 1997

(30) Foreign Application Priority Data

Mar. 13, 1996 (JP) .................................... 8-055253

(51) Int. Cl.[7] .................................... H04B 10/00
(52) U.S. Cl. .................... 359/161; 359/187; 375/296
(58) Field of Search .................... 359/125, 161, 359/187; 372/33, 38; 375/296

(56) References Cited

U.S. PATENT DOCUMENTS 5,680,238 * 10/1997 Masuda ................ 359/125

FOREIGN PATENT DOCUMENTS 1-277368  11/1989  (JP) .
2-207585   8/1990  (JP) .

OTHER PUBLICATIONS

Kishimoto et al., "Suppression of clipping–induced distortion by means of a limiting circuit technology", *Electronic Intelligence Communication Society Meeting B–682*, 1955, p. 349.

* cited by examiner

Primary Examiner—Kinfe-Michael Negash
(74) Attorney, Agent, or Firm—Sughrue, Mion, Zinn, Macpeak & Seas, PLLC

(57) ABSTRACT

A clipping distortion controlling circuit for stabilizing an amount of generation of the clipping distortion. A level of the clipping distortion generated by a light-emitting semiconductor laser element is monitored through a light-receiving element and a band-pass filter. A limiter-level of a pre-clipping circuit is changed to be controlled in accordance with the level of the clipping distortion. For this reason, it is capable of coping with the level-fluctuation of the clipping distortion caused by gain-change of an amplifier or by characteristic degradation of the light-emitting element, so that clipping distortion generation has a stabilized characteristic.

14 Claims, 2 Drawing Sheets

CLIPPING DISTORTION CONTROLLING CIRCUITS

BACKGROUND OF THE INVENTION

The present invention relates to a clipping distortion controlling circuit, and in particular to a clipping distortion circuit for controlling generated from a light-emitting element in an optical transmitter used for an optical CATV (Cable Television) system in which both a digital signal and an analog signal are transmitted simultaneously.

DESCRIPTION OF THE PRIOR ART

When both a digital signal and an analog signal, for example including a 64 QAM (Quadrature Amplitude Modulation) signal, are transmitted simultaneously using a multi-carrier transmission system like an optical CATV system, problems result from an impulse-attributive clipping distortion generated from a light-emitting element such as a laser diode and, caused by the analog signal, causes the error-rate of the digital signal to become floor-state. In other words, the error-rate of the digital signal cannot be improved beyond a certain value.

The clipping distortion will be described in reference to FIG. 1. As shown in FIG. 1, the waveform x denotes an input-current waveform of the laser, the waveform y denotes an optical-output waveform corresponding to the waveform x, and curve z denotes an I-L (laser driving current-optical-output) characteristic of the laser. In the case of the multi carrier transmission scheme using a plurality of carriers, generally an input waveform x of the laser becomes super-positioned with a plurality of sinusoidal waves. For this reason, in cases where some carriers all in phase with each other, and carrier amplitude thereof is also in phase, the amplitude thereof grows, so that the input waveform of the laser has a peak value greater than the oscillation threshold value T of the laser. In this case, the input waveform x is clipped. This is shown in FIG. 1 as the clipping C of the waveform y. An impulse-attributive large distortion is generated by this clipping. This is the clipping distortion.

The bandwidth of the clipping distortion extends over the large bound. If the level of the distortion is large, a problem results in that the error rate of a digital-channel becomes floor-state with high-level (for example, 1×10$^{-3}$). In order to eliminate this problem, the level of the input signal can be reduced. However, other problems arise in that the CNR (Carrier to Noise Ratio), which has a minimum required level, is too low in this case where the level of the input signal is diminished.

The literature cited: Clipping Noise Suppression by Limiter Circuit (1955; Electronic Intellingence Communication Society Meeting B-682), includes a technique which resolves the problems. In this technique, the analog signal passes through both a limiter and a low-pass filter before the analog signal is multiplexed with the digital signal.

A circuit which suppresses the clipping distortion will be described by referring to FIG. 2. In FIG. 2, a conventional clipping distortion circuit has a light-output 300, wherein both the analog RF (Radio Frequency) signal 100 and the digital RF (Radio Frequency) signal 200 are input signals. The circuit shown in FIG. 2 comprises an amplifier 1 for amplifying the analog RF signal 100, a pre-clipping circuit 11 which operates as the limiter, a filter 3 that can be a low-pass filter which eliminates a radio-frequency component of the output thereof, a multiplexer 10 for superimposing the digital RF signal 200 on the filtered-output, and a light-emitting element 5 for converting the multiplexed output into a light-signal.

The light-emitting element 5 is a semiconductor laser element such as a laser diode and Vee is a power-supply voltage. C1 and C2 are DC-blocking capacitors.

In this circuit, the pre-clipping circuit 11 causes the signal outputted from the amplifier 1 to first clip by means both of the diode 111 whose anode side is grounded through a DC power supply 113, and the diode 112 whose cathode side is grounded through the DC power supply 114. Regarding the output signal of the pre-clipping circuit 11, the amplitude of the output signal is restricted and a lot of distortion-components are incorporated. The distortion, which increases the high-frequency component rather than the carrier component of the analog RF signal 100, affects the digital signal. For this reason, the low-pass filter 3 is provided for blocking the distortion. The distortion component is eliminated by the low-pass filter before the digital RF signal 200 is superimposed by the multiplexer 10. As a result, generation of the clipping distortion caused by the laser element is prevented, because the analog RF signal 100 is subjected to the amplitude restriction by the pre-clipping circuit 11.

However the above-described conventional circuit cannot cope with the level-fluctuation of the clipping distortion caused by gain-fluctuation of the amplifier or characteristic degradation of the laser element or the like. In a worst case, this defect can cause communication-failure.

Japanese Patent Application Laid-Open No. Hei 1-277368 relates to optical information record reproducing and, accordingly, does not resolve the above defects.

SUMMARY OF THE INVENTION

In view of the foregoing, it is an object of the present invention to provide a novel and improved circuit that eliminates the above-described defects of the conventional art by controlling clipping distortion, in order to stabilize the amount of generation of the clipping distortion.

According to one aspect of the present invention, for achieving the above-mentioned object, there is provided a clipping distortion controlling circuit that comprises limiting means for restricting an analog input signal below a required threshold value before outputting thereof, a semiconductor laser element for converting the restricted-output signal together with a digital input signal into an optical signal and transmitting the converted optical signal, and controlling means for changing the threshold value in accordance with a distortion-component of the optical signal.

As stated above, a clipping distortion controlling circuit according to the invention in which in a level of the clipping distortion generated by a light-emitting element, a semiconductor laser element, is monitored through a light-receiving element and a band-pass filter, a limiter-level of a pre-clipping circuit is changed in accordance with the distortion level. For this reason, the circuit is capable of coping with the level-change of the clipping distortion caused by gain-change of an amplifier or by characteristic degradation of the light-emitting element, and stability is obtained.

The above and further objects and novel features of the invention will be more fully understood from the following detailed description, read in connection with the accompanying drawings. It should be expressly understood, however, that the drawings are for purpose of illustration only and are not intended as a definition of the limits of the invention.

DETAILED DESCRIPTION OF THE PREFERRED EMBODIMENTS

A preferred embodiment of the present invention will now be described in detail referring to the accompanying drawings.

Figure 1:
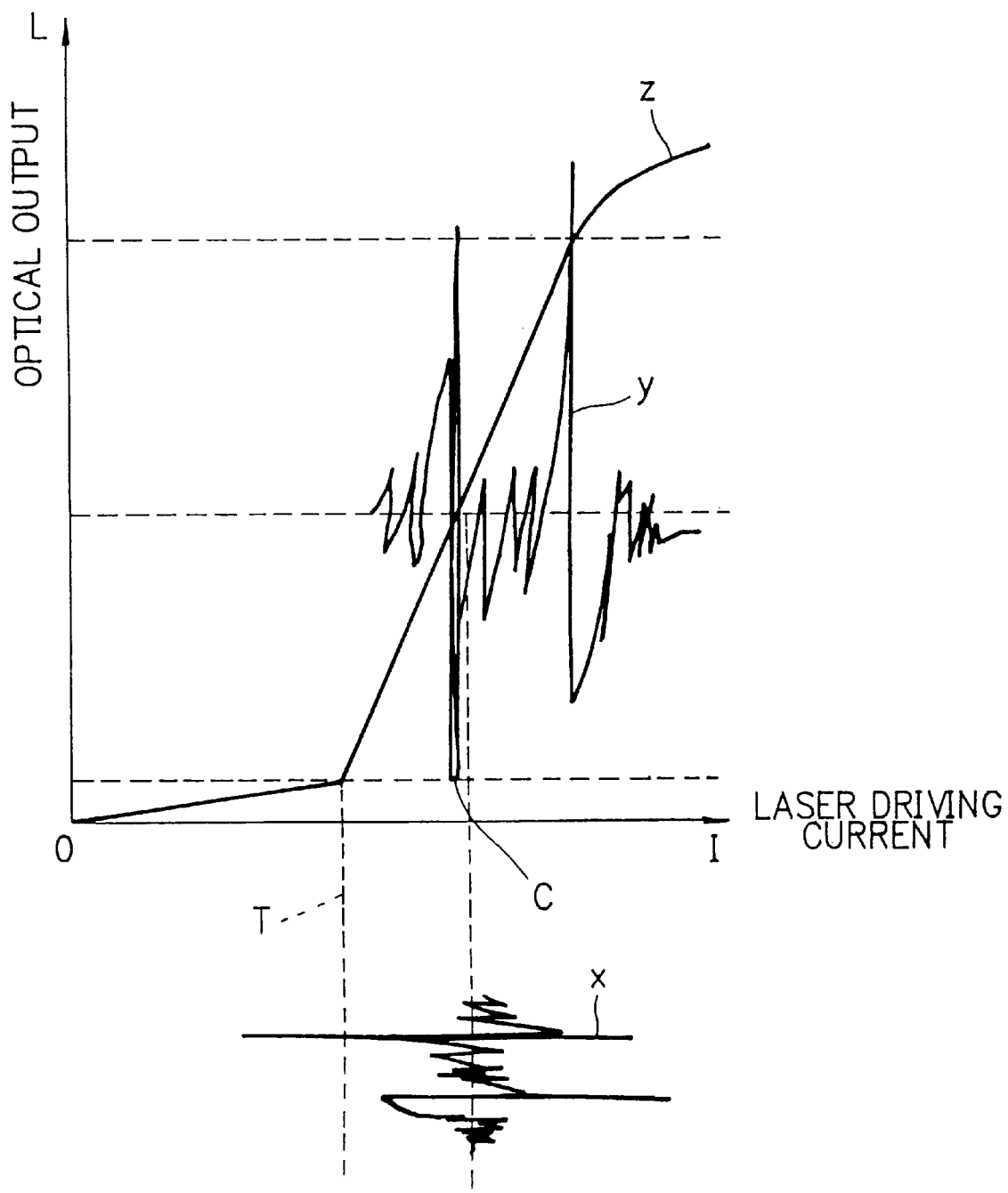
FIG. 1 is a view showing a generating principle of the clipping distortion.
Figure 2:
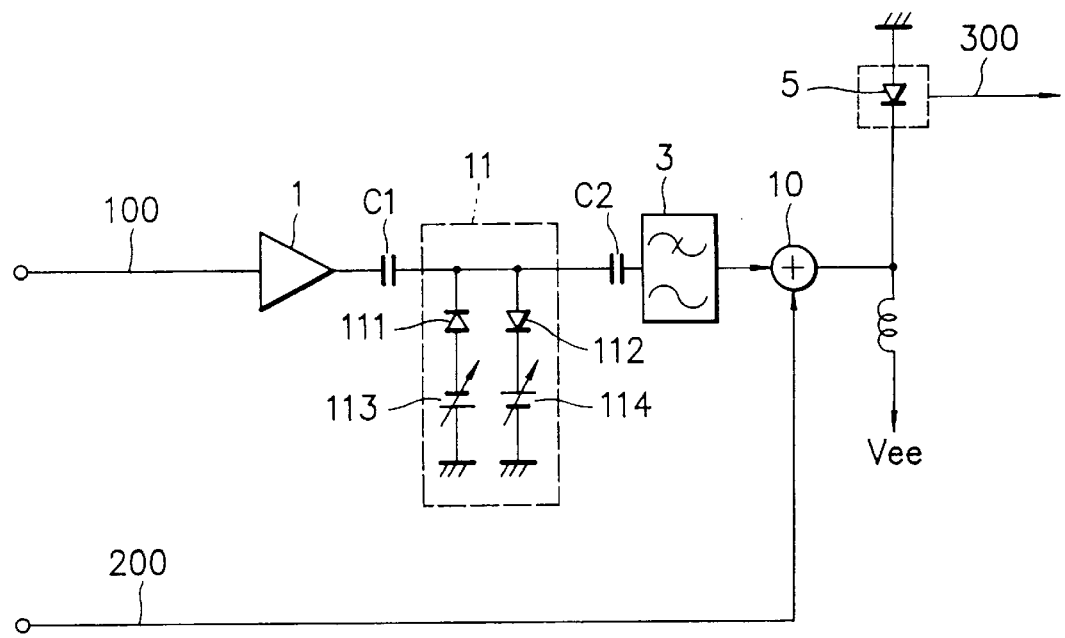
FIG. 2 is a block diagram showing a conventional clipping distortion controlling circuit.
Figure 3:
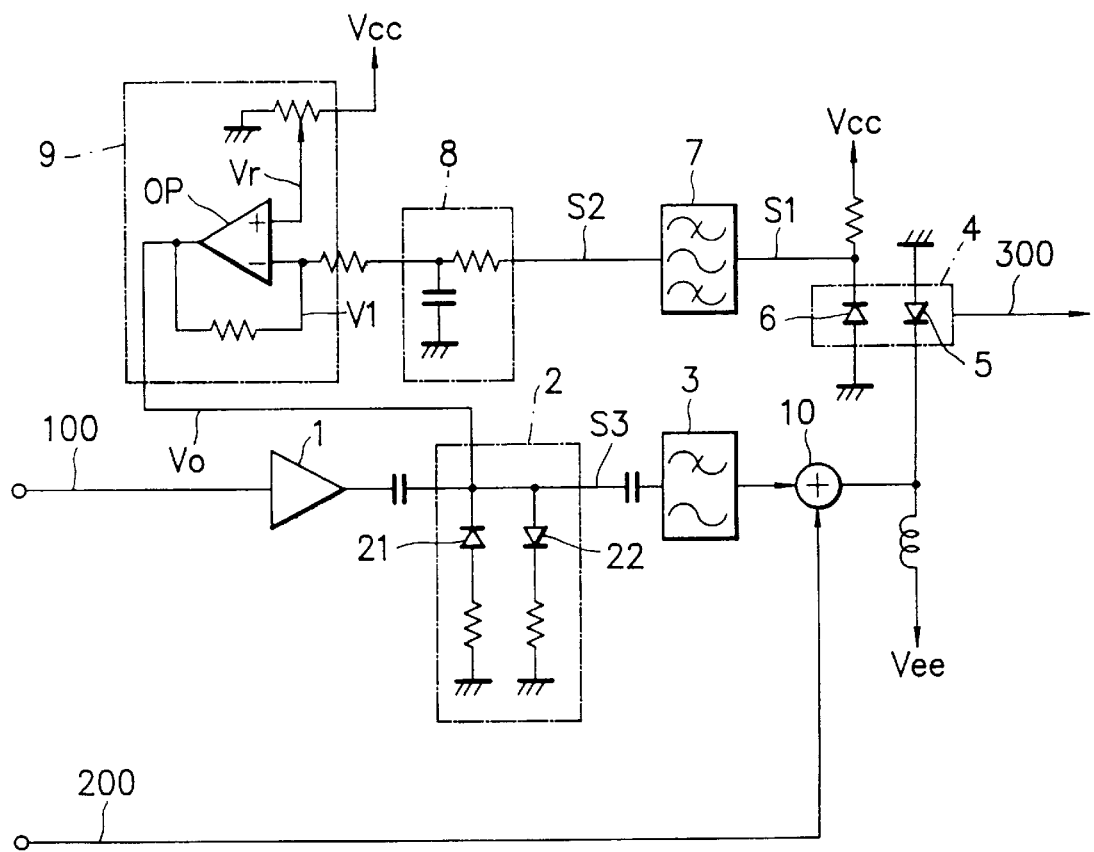
FIG. 3 is a block diagram showing a clipping distortion controlling circuit of one embodiment according to the present invention.

FIG. 3 is the block diagram showing the embodiment of the clipping distortion controlling circuit according to the present invention. As shown in FIG. 3, the same parts as those of conventional FIG. 1 are given the same reference designators. The clipping distortion controlling circuit according to one embodiment of the invention, includes a laser module 4 consisting of a light-emitting element 5 and a pin-photo diode 6 for converting an outputted optical signal of the light-emitting element 5 into an electric signal. The circuit allows a limiter level of the pre-clipping circuit 2, namely the threshold value, to be controlled in accordance with the output of the pin-photo diode 6.

The clipping distortion controlling circuit according to the embodiment comprises an amplifier 1 for amplifying the analog RF signal 100 from the outside, a pre-clipping circuit 2 for clipping beforehand an amplitude of the output signal of the amplifier 1 by means both of a diode 21 whose anode side is grounded through a resistor, and a diode 22 whose cathode side is grounded through a resistor, a filter 3 such as a low-pass filter, for passing through only a signal-component of the output signal from the pre-clipping circuit 2, a multiplexer 10 for multiplexing the output signal of the filter 3 with the digital RF signal 200, and a light-emitting element 5 such as a laser diode, driven by the output signal from the multiplexer 10 for converting the electric signal into the optical signal.

The clipping distortion controlling circuit according to the embodiment further comprises a light receiving element 6 such as a pin-photo diode, for converting the optical signal from the light-emitting element 5 into an electric signal, a filter 7 such as a band-pass filter, for deriving only an intermodulation-distortion frequency component from the signal S1 which was photoelectric-converted by the light receiving element 6, a peak-detecting circuit 8 consisting of a series resistor and a capacitor for performing a peak holding operation word for peak-detection of the output signal S2 of the filter 7, and a relative amplifier 9 consisting of an operational amplifier OP, for performing relative amplification between an output voltage of the peak-detecting circuit 8 and a reference voltage Vr before controlling an amount of clipping of the pre-clipping circuit 2.

In this circuit, the output signal from the light-emitting element 5 is subjected to photoelectric-conversion by the light-receiving element 6, both elements located within laser module 4. The signal S1 outputted from the light-receiving element 6 includes a frequency component of the clipping distortion. The filter 7 is a band-pass filter that pulls only the distortion component that is to be monitored out of the frequencies of the clipping distortion.

The output signal S2 from the filter 7 is inputted to the peak-detecting circuit 8 for detecting the level thereof. The output voltage V1 of the peak-detecting circuit 8 is inputted to a comparison-amplifier 9, thus being compared to be amplified with regard to a reference voltage Vr obtained from the power supply voltage Vcc by voltage-division. At this time, if the value of the voltage V1 is larger than the value of the voltage Vr, the output voltage V0 of the comparison-amplifier 9 decreases. Since the output of the comparison-amplifier 9 is applied to the pre-clipping circuit 2, the amplitude of the signal S3 is lowered by decreasing the value of the output voltage V0. As a result, the clipping distortion decreases.

Inversely, when the value of voltage V1 is smaller than the value of voltage Vr, the value of output voltage V0 rises, so that the amplitude of signal S3 grows and the clipping distortion increases. When the value of voltage V1 is equivalent to the value of voltage Vr, the circuit is in a stable state, where the clipping distortion is kept at the most suitable state.

As described above, the circuit allows the clipping distortion of the light-emitting element to be monitored, thus changing the limiter-level of the pre-clipping circuit, stabilizing the amount of generation of the clipping distortion.

The reference voltage Vr is obtained in such a way that the power supply voltage Vcc is subjected to the voltage-division. With regard reference voltage Vr obtained by voltage-division of the power supply voltage Vcc, an appropriate reference voltage level should be selected in accordance with the required error rate. Namely, when reducing the error rate of a digital signal transmitted by optical-transmission, it is proper to select the point of voltage-division which lowers the reference voltage Vr, thereby decreasing the clipping distortion. In the inverse case, it is proper to select the point of voltage-division which raises the reference voltage Vr, thereby increasing the clipping distortion.

As stated above, in the circuit for controlling the clipping distortion according to the present invention, the level of generated clipping distortion caused by the laser element is monitored before the limiter-level of the pre-clipping circuit is changed, whereby the amount of clipping distortion generation is stabilized.

While preferred embodiments of the invention have been described using specific terms, such description is for illustrative purpose only, and it is to be understood that changes and variations may be made without departing from the spirit or scope of the following claims.

What is claimed is:

1. A clipping distortion controlling circuit including: limiting means for restricting an analog input signal to a level below a threshold value and then outputting said restricted analog input signal; a semiconductor laser element for converting a combined signal into an optical signal and for transmitting the optical signal, a digital input signal being combined with said restricted analog input signal to form said combined signal; and controlling means for changing said threshold value in accordance with a distortion-component of said optical signal.

2. A clipping distortion controlling circuit as claimed in claim 1, wherein said controlling means further comprises a distortion-component deriving means for deriving a distortion-component of said optical signal, thus allowing said threshold value to change in accordance with the derived distortion-component.

3. A clipping distortion controlling circuit as claimed in claim 2, wherein said controlling means further comprises comparing means for comparing a voltage level of the distortion-component derived from said distortion-component deriving means with a reference voltage level, thus allowing said threshold value to change in accordance with the compared-result.

4. A clipping distortion controlling circuit as claimed in claim 2, wherein said distortion-component deriving means further comprises a light-receiving element for receiving said optical signal and a filter for filtering out all signal components except for the distortion-component in the light-reception signal.

5. A clipping distortion controlling circuit as claimed in claim 4, wherein said semiconductor laser element and said light-receiving element are integrated into a module.

6. A clipping distortion controlling circuit as claimed in claim 1, wherein said semiconductor laser element is a laser diode.

7. A clipping distortion controlling circuit as claimed in claim 4, wherein said light-receiving element is a pin-photo diode.

8. A clipping distortion controlling circuit as claimed in claim 1, wherein said limiting means comprises a pre-clipping circuit that comprises a first diode whose anode side is grounded through a resistor and a second diode whose cathode side is grounded through a resistor, and wherein the cathode side of said first diode and the anode side of said second diode are both connected to a signal produced by amplifying said analog input signal.

9. A method for controlling clipping distortion, comprising the steps of:

converting an output signal from a light-emitting element by photoelectric-conversion into a first electric signal containing frequency components of clipping distortion;

obtaining a second signal by selecting only required distortion components to be monitored among frequencies of the clipping distortion contained in said first signal;

inputting said second signal for detecting the level thereof into a peak-detecting circuit; and comparing a voltage Vi outputted from said peak-detecting circuit with a reference voltage.

10. A method for controlling clipping distortion as claimed in claim 9, further comprising the step of:

changing a level at which an analog signal is clipped in accordance with said comparison of a voltage Vi with a reference voltage, wherein said level changing corresponds to a magnitude of said second signal, and wherein said reference voltage is obtained by voltage-dividing a power supply voltage.

11. A clipping distortion controlling circuit, comprising:

a pre-clipping circuit comprising a plurality of diodes connected to ground, said pre-clipping circuit restricting an analog input signal using a threshold value;

a semiconductor laser element that converts said restricted signal combined with a digital input signal into an optical signal, said element transmitting said optical signal; and a controller that changes said threshold value in accordance with a distortion-component of said optical signal, said controller comprising a comparator.

12. A clipping distortion controlling circuit as claimed in claim 11, wherein said controller further comprises a light-receiving element that receives said optical signal and outputs a light-reception signal.

13. A clipping distortion controlling circuit as claimed in claim 12, wherein said controller further comprises a band-pass filter that filters out all signal components of said light-reception signal except for a derived distortion-component that corresponds to said distortion-component of said optical signal, thus allowing said threshold value to change in accordance with said derived distortion-component.

14. A clipping distortion controlling circuit as claimed in claim 12, wherein said comparator compares a voltage level of said distortion-component with a positive reference voltage level.

* * * * *